Patented Feb. 7, 1928.

1,658,176

UNITED STATES PATENT OFFICE.

MORRIS G. SHEPARD, OF NEW YORK, N. Y., ASSIGNOR TO THE NAUGATUCK CHEMICAL COMPANY, OF NAUGATUCK, CONNECTICUT, A CORPORATION OF CONNECTICUT.

CATALYTIC ALKYLATION OF AROMATIC HYDROCARBONS.

No Drawing.   Application filed March 7, 1925.   Serial No. 13,854.

This invention relates to an improved method for carrying out the alkylation of aromatic hydrocarbons in the presence of a catalyst.

The use of a catalyst, such as aluminum chloride or other metallic chloride in the alkylation of aromatic hydrocarbons, has been known for some time, under the name of the discoverers, Friedel and Crafts. This method of alkylation has been the basis of considerable investigation and improvement. In the original method, an aromatic hydrocarbon was acted upon by an alkyl halide in the presence of aluminum chloride as a catalyst. Later studies led to a method of carrying out the same reaction by a process wherein the metal chloride was generated within the reaction mixture, as for example by placing a quantity of metallic aluminum and hydrochloric acid in the aromatic hydrocarbon and after allowing to stand for a time, adding the alkyl halide. This improved method, however, required that the mixture of hydrocarbon, metal and halogen acid be allowed to stand for a day or more in order to insure the reaction of the acid with the metal. During the Friedel and Crafts reaction, a heavy, dark brown oil separates out at the bottom of the reaction mixture. This oil, which may be a reaction product of the hydrocarbon, alkyl halide, and aluminum chloride, has catalytic properties and can be used to carry out the same reaction of alkylation. However, it does not continue its effectiveness indefinitely, but must be discarded.

The present invention has for its object the regeneration of this oily catalytic reaction product. Another object of the invention is to provide an improved and economical method of carrying out the Friedel and Crafts reaction. A still further object of the invention is to provide an economical method for preparing ethyl benzol.

With a preferred example in mind, but without intention to limit the invention beyond what may be required by the prior art, the invention, broadly stated, consists in alkylating aromatic hyrocarbons by the Friedel and Crafts reaction in the presence of a catalyst comprising a reaction product of an aromatic hydrocarbon, an alkyl halide, and a metallic halide, said reaction product being enriched from time to time by the addition of further quantities of metal. The invention includes the alkylation of benzol in the presence of a regenerated catalyst comprising the above catalytic reaction product. It also includes an improved method for the ethylation of benzol.

In carrying out the process of this invention, the Friedel and Crafts reaction is started in the usual way, using aluminum chloride as the catalyst. The catalytic mass is obtained at the end of the run, and can be used for subsequent alkylations. The catalytic mass after a few runs loses its strength and must be discarded. It has now been discovered that by the subsequent additions of small quantities of metallic aluminum, for example aluminum powder or filings, to the partly exhausted catalytic mass, the latter quickly regains its catalytic strength and can be used indefinitely.

The theory of the process of regeneration is as follows: During the Friedel and Crafts reaction, quantities of hydrochloric acid are evolved by the splitting of hydrogen from the aromatic hydrocarbon, and of chlorine from the alkyl chloride. As the quantity of metallic aluminum added at any one time is quite small, it is easily and quickly converted to the chloride by the amount of acid in the reaction mixture. The addition of the metal to the oily catalytic mass can be made during the course of the reaction.

The following table illustrates the process of the invention:

| Run. | Benzol. | Ethyl chloride. | Aluminum chloride. | Aluminum metal. | Oily catalytic mass produced. |
|---|---|---|---|---|---|
| 1 | 312 | 85 | 25 |  | 76.6 |
| 2 | 312 | 85 |  |  | 92.0 |
| 3 | 312 | 85 |  | 1.5 | 82.4 |
| 4 | 312 | 85 |  |  | 74.1 |
| 5 | 312 | 85 |  | 1.0 | 84.0 |
| 6 | 312 | 85 |  |  | 79.0 |
| 7 | 312 | 85 |  |  | 62.1 |

In this table are given data from seven runs of a Friedel and Crafts reaction comprising the combination of benzol and ethyl chloride to form ethyl benzol. In the first run, 25 grams of aluminum chloride were used, and 76.6 grams of oily catalytic mass were obtained. In the next run no metal chloride was added, but a small quantity of metallic aluminum was added to the oily catalytic mass obtained from the first run. In the second run, 92 grams of oily catalytic mass were obtained. The third and fourth runs were made with the oily catalytic mass alone, but one gram of aluminum was added to the oily catalytic mass in run five. The sixth and seventh runs were made with the oily catalytic mass alone. At the end of the seventh run, 62.1 grams of oily catalytic mass remained, as compared with 76.6 grams at the end of the first run. The oily catalytic mass after run seven was just as active as that after the first run, and the amount of product, ethyl benzol, was much more than could have been obtained by the usual Friedel and Crafts reaction with the amount of aluminum chloride used, namely 25 grams. The importance of the present invention is therefore quite apparent, both with respect to economy of manufacture and of cost.

While the ethylation of benzol has been chosen as an illustration of the invention, it is understood that the process can be applied to other alkylations where it has been customary to employ the Friedel and Crafts reaction. By this improved economical method, it is possible to manufacture commercially alkylated aromatic hydrocarbons which heretofore have not been produced in quantity, except at high cost, due to the amount of aluminum chloride required to effect the alkylation. While aluminum chloride has been used as the example of the metallic halide, it is of course understood that the invention includes within its scope other metallic halides, the metallic portion of which is known to be of use in the Friedel and Crafts reaction.

Having thus described my invention, what I claim and desire to protect by Letters Patent is:

1. An improved method of alkylating aromatic hydrocarbons according to the Friedel and Crafts reaction which consists in causing an aromatic hydrocarbon and an alkyl halide to react in the presence of an aluminum halide, separating a catalytic mass therefrom and carrying out subsequent alkylations in the presence of the mass, from time to time reactivating said mass by the addition of aluminum.

2. An improved method of alkylating aromatic hydrocarbons according to the Friedel and Crafts reaction which consists in alkylating an aromatic hydrocarbon in the presence of a catalyst comprising the reaction product of said aromatic hydrocarbon, an alkyl halide, and an aluminum halide, said reaction product being re-activated from time to time by the addition of metallic aluminum thereby forming further aluminum halide therein.

3. An improved method of alkylating benzenoid hydrocarbons by the Friedel and Crafts reaction, which consists in treating said hydrocarbons with an alkly chloride in the presence of aluminum chloride, separating a catalytic mass from the reaction product, adding the mass to fresh hydrocarbon and alkyl chloride, and repeating the separation and addition, from time to time re-activating the mass by the addition of quantities of aluminum.

4. An improved method of ethylating benzol by the Friedel and Crafts reaction which consists in treating benzol with ethyl chloride in the presence of aluminum chloride, separating a catalytic oily mass from the ethyl benzol, adding the catalytic oily mass to fresh quantities of benzol and ethyl chloride, repeating the separation and addition, and during said subsequent additions maintaining the catalytic activity of the mass by the occasional addition of metallic aluminum to form fresh aluminum chloride within the reaction mixture.

5. An improved method of alkylating aromatic hydrocarbons according to the Friedel and Crafts reaction which consists in causing an aromatic hydrocarbon and an alkyl halide to react in the presence of a metallic halide capable of carrying out the Friedel and Crafts reaction, separating a catalytic mass therefrom and carrying out subsequent alkylations in the presence of the mass, from time to time reactivating said mass by the addition of the same metal present in said metallic halide.

6. An improved method of alkylating aromatic hydrocarbons according to the Friedel and Crafts reaction which consists in alkylating an aromatic hydrocarbon in the presence of a catalyst comprising the reaction product of said aromatic hydrocarbon, an alkyl halide, and a metallic halide capable of carrying out the Friedel and Crafts reaction, said reaction product being reactivated from time to time by the addition of the same metal as is contained in said metallic halide, thereby forming further metallic halide therein.

7. An improved method of alkylating hydrocarbons which comprises causing an aromatic hydrocarbon and an alkyl halide to react in the presence of a metallic halide suitable for carrying out the Friedel and Crafts reaction, separating a catalytic mass therefrom, and carrying out subsequent alkylations in the presence of the mass, maintaining the activity of said catalytic mass by periodically adding a further quantity of the same metal as is present in said metallic halide thereto.

8. As an improved catalytic mass especially suitable for carrying out the Friedel and Crafts reaction, an oily reaction product of aromatic hydrocarbon, alkyl halide and metallic halide, said metallic halide being of the type employed for carrying out the Friedel and Crafts reaction.

9. An improved catalyst for the production of ethyl benzol which comprises an oily reaction product of benzol, ethyl chloride and aluminum chloride, said catalyst being capable of reactivation a number of times by the periodic addition of small quantities of aluminum.

Signed at New York, county and State of New York, this 27th day of February, 1925.

MORRIS G. SHEPARD.